(12) United States Patent  
Chander et al.

(10) Patent No.: US 8,609,053 B2  
(45) Date of Patent: Dec. 17, 2013

(54) PROCESS FOR PREPARING OF NANOWIRES OF METAL OXIDES WITH DOPANTS IN LOWER VALENCE STATE

(75) Inventors: Harish Chander, New Delhi (IN); Virendra Shanker, New Delhi (IN); Divi Haranath, New Delhi (IN); Pooja Sharma, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 602 days.

(21) Appl. No.: 12/134,635

(22) Filed: Jun. 6, 2008

(65) Prior Publication Data

US 2009/0123355 A1 May 14, 2009

(30) Foreign Application Priority Data

Nov. 13, 2007 (IN) .......................... 2372/DEL/2007

(51) Int. Cl.
| | |
|---|---|
| *C01F 17/00* | (2006.01) |
| *C01F 7/00* | (2006.01) |
| *C01F 11/02* | (2006.01) |
| *C01F 11/36* | (2006.01) |

(52) U.S. Cl.
USPC ........... 423/263; 423/278; 423/335; 423/608; 423/609; 423/610; 423/618; 423/619; 423/640; 252/301.4

(58) Field of Classification Search
USPC ................. 423/263, 278, 335, 625, 618, 619, 423/608–610, 641; 252/301.4
IPC .............. C09K 11/81; C01F 7/00,11/02, 11/36, C01F 17/00
See application file for complete search history.

(56) References Cited

U.S. PATENT DOCUMENTS

| | | | | |
|---|---|---|---|---|
| 5,945,370 | A | * | 8/1999 | Yokoi et al. .................... 502/304 |
| 2002/0096990 | A1 | * | 7/2002 | Otsuka .......................... 313/483 |
| 2005/0064731 | A1 | * | 3/2005 | Park et al. ...................... 438/800 |
| 2005/0097989 | A1 | * | 5/2005 | Sekine ............................. 75/334 |
| 2005/0285083 | A1 | * | 12/2005 | Krishna et al. .......... 252/301.4 P |

OTHER PUBLICATIONS

Bera (Studies on Cu/CeO2: a new NO reduction catalyst, Journal of Catalysis, 1999, 18:36-44).*

* cited by examiner

*Primary Examiner* — Jun Li  
(74) *Attorney, Agent, or Firm* — K&L Gates LLP

(57) ABSTRACT

The present invention provides a process for the preparation of nanowires of metal oxides with dopant elements in lower valence state. The nanomaterials/materials with dopants in lower valence state are important as these exhibit markedly different characteristics than higher valence state materials of same composition. Nanowires show markedly enhanced properties in lateral direction. The invented process presents a procedure for preparation of different types of nanowires in oxide form that are useful for different applications. In this a precursor is ignited in a specially designed container/enclosure that produces the product with the described features. The process is simple and involves a single step/stage is of very short time per batch. The invention provides a process, which gives controlled size of nanowires and is suitable for the production of nanowires/nanomaterials of desired metal oxides with dopant elements in valence state.

24 Claims, 4 Drawing Sheets

TEM image of $SrO.Al_2O_3.Eu^{2+},Dy^{3+}$ phosphor with 4.44 f/o ratio

Fig. 2: Excitation and emission spectra of SrO.Al2O3.Eu2+, Dy3+ phosphor

Fig 3: TEM image of $SrO.Al_2O_3.Eu^{2+},Dy^{3+}$ phosphor with 4.44 f/o ratio

PROCESS FOR PREPARING OF NANOWIRES OF METAL OXIDES WITH DOPANTS IN LOWER VALENCE STATE

FIELD OF THE INVENTION

The present invention relates to a process for the preparation of nanowires of metal oxides with dopants in lower valence state. Particularly, the present invention relates to a process for the preparation of nanowires of metal oxides with dopants in lower valence state by combustion synthesis technique. More particularly, the present invention provides a process for the preparation of nanowires/nanomaterials of one or more metal oxides with a dopant element in lower valence state requiring reducing atmosphere. Nanowires have size of less then 100 nm in transverse direction and length from one to several micrometers

BACKGROUND OF THE INVENTION

Nanomaterials have become important in recent years because of the markedly different electrical, optical and structural properties of these as compared to those in the conventional bulk form. For example, semiconductor nanocrystals exhibit a continuous shift of the absorption energy to higher energies due to quantum confinement. Further, it is an observed fact that morphology of nanomaterials like spheres, rods, needles, wires and tube play an important role in deciding application of these. This makes study of nano-structured materials one of the frontier areas of research in synthesis chemistry and condensed matter physics. The enormous global interest in the field is also due to the fabrication of devices using nanomaterials with special and advanced features. Nanotechnology being an emerging and pioneer area, there is a lot of scope for development of new techniques and processes for preparation of nanomaterials in different shapes.

The development of nanomaterials for devices and varied applications will depend on basic understanding of the mechanism of enhancement in properties with respect to morphology and changes in crystal structure of these down to quantum level. These developments are demanding refinement of existing and a search for newer preparation processes of nanomaterials with an emphasis on control of particle shape and dimensions. A number of synthesis processes for nanomaterials such as chemistry by microwaves, mechanochemistry, self-assembly, lithography, template and membrane based synthesis have been developed and employed by scientists, chemists and engineers the world over, but the researcher will always be on look out to produce nanomaterials with a cheaper, cleaner, reliable and industrially feasible techniques and be able to exercise precise control over important characteristic of particle aspect ratio and structure. Realization of these challenges is possible only with control of thermodynamics and kinetics of reaction, nucleation, growth, aging etc. in a process.

The valence state of multivalent elements in their compounds singly or in combination with one or more compounds has profound effect on their properties and hence the applications. Different colour of ferrous and ferric salt solution is sighted as an example. A process for preparation must take care of valence state along with crystallization of parent as well as dopant atoms in the mass as well as surface of nanomaterials since surface to volume ratio of these materials is very high.

A number of patents have appeared on preparation of nanomaterials with different processes. Matson et al filed U.S. Pat. No. 5,238,671 in August 1993 for preparation of nanomaterials by chemical reactions involving reverse micelle/microemulsion systems. In this a microemulsion of a polar fluid e.g. an aqueous fluid is made in non-polar fluid in supercritical state. Reactants are introduced into the micelles via non-polar fluid, which is a continuous phase. Gallagher et al patented (U.S. Pat. No. 5,525,377 June 1996) a method of manufacturing encapsulated doped particles of size <100° A. Nanomaterial is precipitated with a coat of a surfactant by first encapsulating an organometallic compound containing one element of host material and subsequently precipitating with addition of other components. A sol-gel type process was patented (U.S. Pat. No. 5,637,258 June 1997) by Goldburt et al for producing rare-earth activated metal oxide nanomaterials. They employed n-butoxide solution of host and long gelation procedure to prepare the specific category of product. U.S. Pat. No. 5,770,172 June 1998 by Linehan et al is similar to 1993 patent of Matson et al where nanosize of material prepared has been emphasised. Chhabra V et al filed another patent in (U.S. Pat. No. 6,036,886 March 2000) for preparation of activated i.e. doped metal oxide nanomaterials using microemulsion technique. In this two microemulsions containing compounds with individual radials constituting the oxide are separately prepared and mixed to form third emulsion with desired oxide. Glumac et al 1999 patented (U.S. Pat. No. 5,876,683) a method of combustion flame synthesis of nanophase materials. The method involves control thermal decomposition of one or more metalorganic precursors in a flat-flame combustor unit in which both temperature distribution and gas phase residence time are uniform over the entire surface of the burner.

Laine et al. patented in 1999 (U.S. Pat. No. 5,958,361) a process for preparation of ultra fine metal oxide particles by flame spray pyrolysis of solution containing gycolato polymetallooxanes dissolved in a volatile organic solvent. In another technique, patented by Yadav et al as per US Pat 2003138368 production of high purity nanomaterials is achieved by preparing liquid precursors of the desired nanomaterials first and then these are pumped into a plasma reactor maintained at 3000-6000° C. using DC arc and argon gas. For preparation of MgO aqueous solution of Mg acetate is used as precursor. A method and apparatus for direct electro thermal-physical conversion of ceramic into nanopowder has been patented vide patent U.S. Pat. No. 6,600,127 B1 July 2003 by Paterson et al. It utilizes a hybrid exploding wire device containing a solid metal wire fuse in a bore of a tube which is open at both ends. Bore is filled with ceramic powder whose nanophase is desired. An electrical discharge produces the plasma and hence the nano ceramic particles. Another method for producing semiconductor quantum particle was patented vide patent U.S. Pat. No. 6,623,559 B2 by Wen-Chiang Huang which uses super heated fine sized fluid droplets of a metal and a non-oxygen reacting element like p, As, S, Se and Te. U.S. Pat. No. 6,589,496 B1 describes synthesis of metal oxide doped cerium oxide by reacting aqueous cerium salt and metal ion solution with an alkali at temperature lower than 60° C. and at pH>5. Use of oxidizing agent is recommended. US patent application US 2004/0050207 describes gas phase synthesis of nanoparticles in a diffusion flame burner. Design of burner is important. Another patent EP 1378489 describes a method for production of metal oxides by flame spray pyrolysis employing high enthalpy solvents. U.S. Pat. No. 6,733,828 B2 filed by Chao et al in May 2004 on method of fabricating nanostructured materials describes confined synthesis of nanostructured material inside a mesoporous material. A monolayer of charged functional group of nanomaterial to be produced is attached on the inside wall of mesoporous material by reaction. Then nanomaterial is generated by reduction/oxidation etc. Mark and Gareth patented (GB2381530) a process for preparing water soluble particles of luminescent materials. It involves coating particles of the luminescent material with an organic acid or Lewis base such that the surface of the coating possesses one or more reactive group so that these can be used for biotagging. Jose et al claimed (EP1339075) synthesis of magnetic nanoparticles via decomposition of organometallic precursors in solution in presence of a reaction gas and a mixture of organic ligands. Another process for synthesis of nanomaterials particularly of carbon has been patented by Peter et al. (WO 2004007361). A patent US 2005/0087724 A1 relates to Preparation of Gadolinium-yttrium oxide with europium oxide and subsequent sintering under high pressure and temperature. Initial preparation is by combustion synthesis. There is no mention of control of valence state of any oxide. Another US patent application US 2005/0285083 describes a method of making luminescent nanomaterial of varying morphologies and sizes. Materials are lanthanide group phosphates with one or more lanthanides as dopants. After combustion reaction, the powders are heated in a controlled atmosphere at temperatures around 1000° C. Again no claim of lower valence state dopant or constituent is made.

Processes/techniques disclosed above in the prior art disclosures for preparation of nanomaterials involve use of large number of energy and cost intensive starting chemicals and generally there are many stages in the processes. None of the disclosures is describing nanomaterials in metal oxide form in lower valence state in shape of nanowires. These extra steps in the processes make the end product, a nanomaterial very costly. Some of the processes are for a specific type of chemical compound or an application.

OBJECTIVES OF THE INVENTION

The main objective of the present invention is to provide a process for preparation of nanowires of metal oxides with dopants in lower valence state.

Another objective of present invention is to provide a single step/stage process for preparation of nanowires of metal oxides with dopants in lower valence state.

Yet another objective of the present invention is to provide nanowires of metal oxides with dopants in lower valence state in a single step from a liquid/liquid solid paste precursor or precursors Yet another objective of the present invention is to provide the variety of nanomaterials of oxides of metals belonging to IIA, IIIA or IIIB group with one or more dopants of lanthanide series in low valence state.

Still another objective of the present invention is to provide nanomaterial of metal oxides in dry powder form.

SUMMARY OF THE INVENTION

Figure 1:
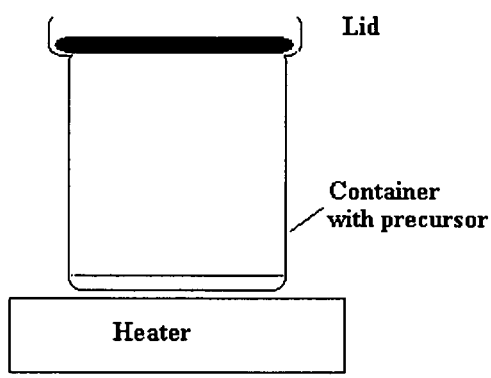
FIG. 1 The figure describes an apparatus consisting of a heater which can be based electrical energy or chemical energy. It should be capable of heating the container with precursor/s mass uniformly to a temperature 200-1000° C. The container with precursor is a cylindrical vessel with closed bottom. Upper part of the container has larger diameter about 1.05-1.10 times than lower part. There is a solid lid that sits smoothly at the shoulder made by the difference of two diameters of the container. The lid lifts up at the time of release of gases during heating and after and sits to stop entry of outside gases when combustion reaction is over.

Accordingly the present invention provides a process for the preparation of nanomaterials of metal oxides doped with metal ions in low valence state and the said process comprising the steps of:
 a) mixing the precursor of nitrate salt of metal belonging to IIA, IIIA or IIIB group with one or more dopant precursor of nitrate salt of lanthanide metals,
 b) homogenizing the above said nitrate metal salts precursors herein described as oxidizer in water along with activated charcoal and combustible organic fuel to obtain a paste like mass,
 c) heating the above said homogenized mass obtained in step (b) in a especially designed container, as herein described, uniformly at a temperature in the range of 200°-1000° C., for a period till a bright yellow flame is produced and volatile gases are removed from the top of the said container,
 d) cooling the above said container and removing the fluffy mass of nanomaterial in the form of nanowires of the desired metal oxides with dopant of lanthanide in low valence state.

In an embodiment of the present invention, the salt of metal used is selected from the group consisting of nitrate, acetate, oxalate, carbonate and hydroxide, preferably nitrate.

In another embodiment of the present invention, the metal in metal salt used is selected from the group consistent of calcium, strontium, Barium, Magnesium, yttrium, aluminum and any mixture thereof.

In yet another embodiment the precursor of dopant used is salt of lanthanide selected from the group consisting of europium, cerium, neodymium, dysprosium or any mixture thereof.

In yet another embodiment the combustible organic fuel used is selected from the group consisting of urea, hydrazine, citric acid and glycine, preferably urea.

In yet another embodiment the temperature used for combustion of fuel is preferably in the range of 200°-600° C.

In yet another embodiment the activated charcoal used is in the range of 0.1-5.0 mole % of total metal salts used in the precursors.

In yet another embodiment the fluffy and voluminous mass obtained in step(c) is reduced to powder to obtain nanowires of the desired metal oxides materials.

In yet another embodiment the size of nanowires of desired metal oxide material is controlled by the ratio of fuel to oxidizer.

In yet another embodiment the molar ratio of fuel to oxidizer used is in the range of 0.5-7.0, preferably 2.0.

In yet another embodiment the size of the nanowires of desired metal oxide material obtained is in the range of 3-15 nm.

In yet another embodiment the container used is made of alumina, quartz, ceramic, or stainless steel, preferably quartz.

In yet another embodiment the container used is capable of withstanding at high temperature of 200°-1200° C.

In yet another embodiment the nanomaterial of metal oxides obtained has dopant metal ion in low valence state of +2 or +3 instead of +3 or +4.

In yet another embodiment the dopant in low valence state present in the nanomaterial of metal oxides is any of $Eu^{+2}$, $Ce^{+3}$, $Nd^{+2}$, $Dy^{+2}$ or any mixture thereof.

In yet another embodiment the nanomaterial of metal oxides obtained is useful for magnetic, luminescent and semi conducting applications.

In yet another embodiment of the invention, the precursor is a liquid or slurry containing element/s in form of nitrates or reactive radicals reducible to oxide by heating. The constituent forms the main body of end product and is called oxidiser.

In a further embodiment of the invention, the precursor components are mixed with sufficient amount of water is used and mass is stirred for homogenisation.

In another embodiment of the invention, the precursor mass is dried to paste like consistency in an oven or by other means.

In a yet another embodiment of the invention, the container is closed with lid and has a non-return valve to let off the gases generated in container.

In a further embodiment of the invention, container with precursor is heated uniformly up to 700° C. or till there appears a bright yellow flame inside the container.

In yet another embodiment the stoichiometric amount of fuel used is determined by accounting for redox valencies of individual components in precursors. In yet another embodiment the valencies of C, H, N, O, Group IA, IIA and IIIA elements are 4, 1, 0, −2, +1, +2 and +3, respectively.

In a still further embodiment of the invention, diameter of nanowires prepared is in range of 3-15 nm and is controlled by fuel to oxidizer ratio.

In a further embodiment of the invention, reaction is very fast and hence batch time is short.

In a still further embodiment of the invention, process on continuous basis gives very high throughput per unit time

DETAIL DESCRIPTION OF THE INVENTION

The present invention provides a procedure for preparation of different types of special nanomaterials in shape of nanowires with dopants in lower valence state that form variety of metal oxides singly or a mixture of many metal oxides useful for many applications. The process gives nanowires in dry powder form. The process is simple and involves a single step/stage. The rate of reaction of the preparation process is very fast. The process gives high production capacities. Process gives controlled size of nanowires. The process is suitable for production of nanomaterials from few grams to hundreds of kilograms per hour.

The invention has diverse applications, as preparation of nanomaterials/nanowires is very important nowadays as these materials are finding newer and crucial high-tech applications everyday. Some of the applications are very high-resolution displays, smart windows, dye-sensitised solar cells, and sensors for various applications, batteries, large value capacitors and others, which are changing fundamental and industrial perspective. Future deployment of nanomaterials in device and varied applications will depend on basic understanding of the mechanism of enhancement in properties and changes in structure of these down to quantum level. These developments are demanding refinement of existing and a search for new preparation processes of nanomaterials with an emphasis on control of properties and morphology. A number of syntheses processes for nanomaterials as described in prior art have been developed and employed by scientists, chemists and engineers the world over, but to produce nanomaterials with a cheaper, cleaner, reliable and industrially feasible technique, is an exquisite goal of inventors. Realization of these challenges is possible only with control of thermodynamics and kinetics of reaction, nucleation, growth, aging etc. in process. The technique must also take care of crystallization with the symmetry of parent as well as dopant atoms at surface of nanomaterials as surface to volume ratio of these materials is very high.

In this invention, nitrates of metals (other metal compounds reducible to oxide on heating e.g. acetates, oxalates, carbonates, hydroxides etc) are taken in calculated amount depending on desired product, mixed with activated charcoal and fuel. Small amount of water is added and whole mass is homogenised by stirring. Mass is dried to paste like consistency. Whole mass is put in the special container with a non-return valve and a one/off valve. The container is uniformly heated to nearly 600° C. As the mass attains ignition temperature of the fuel, a bright yellow flame appears with huge amount of volatiles that escape through the non-return valve. Heating of container is stopped with sighting of the flame. Container allowed to cool. On/off valve is opened to allow air inside the container. Container is opened to obtain nanowires of desired metal oxides with a component in lower valence state. The diameter of nanowires prepared is in range of 3-15 nm and is controlled by fuel to oxidizer ratio as given in Table 1.

TABLE 1

| Fuel to Oxidizer Molar Ratio | Diameter of Nanowire |
| --- | --- |
| 2.0-2.5 | 3-5 nm |
| 4.3-4.8 | 10-15 nm |
| 6.5-7.0 | 7-10 nm |

Novelty of the present invention is in providing a simple process to produce nanomaterials/nanowires on commercial scale that gives nanowires, which is a single metal oxide or a homogeneous mixture of a number of metal oxides. The process has many control parameters to adjust diameter of nanowires, composition of the product etc.

The following examples are given by way of illustration of the present invention and should not be construed to limit the scope of the present invention.

Example 1

Figure 2:
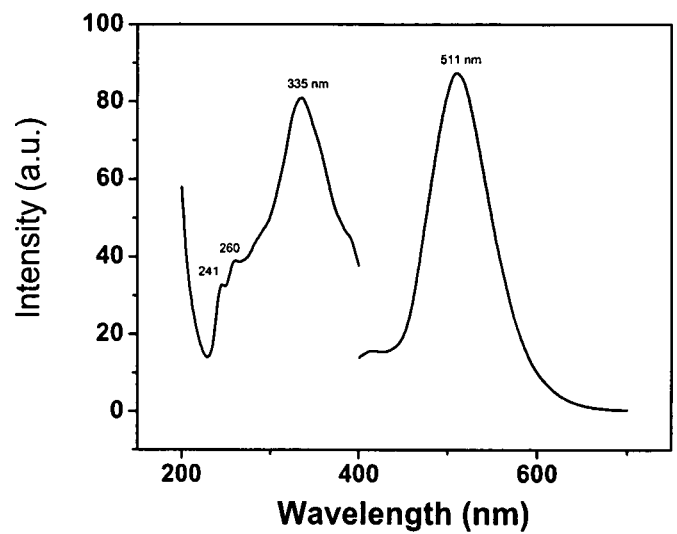
FIG. 2 In the figure curve on the right describes variation of emitted energy with emitted wavelength. Wavelength of ~511 nm is the emission wavelength of $Eu^{2+}$ and not of $Eu^{3+}$. The Curve on the left is showing amount of energy absorbed with wavelength which is responsible for emission at ~511 nm. Again this variation is characteristic to $Eu^{2+}$.
Figure 3:
FIG. 3 The figure shows transmission microscopic image of a typical sample of $SrO.Al2O3.Eu2+,Dy3+$ synthesized by the process described. Nanowires are clearly seen.

Take 5.90 g $Ca(NO_3)_2$, 18.76 g $Al(NO_3)_3.9H_2O$, 0.107 g $Eu(NO_3)_3.5H_2O$, 0.220 g $Nd(NO_3)_3.6H_2O$, 22 g urea and 0.25 g activated charcoal in a ceramic container of 1000 ml capacity of the shape as shown in FIG. 1. Small amount of water is added and whole mass is homogenised by stirring. Mass is dried to paste like consistency. The container is placed on a heater that heats the major part of container uniformly. The heater is heated to 600° C. In about 2-5 minutes, as the container attains temperature, a bright yellow flame will be produced in the container with release of large volume of volatile gases from the top of the container lifting the lid which act as non-return valve. When volatiles cease coming out, Heater is switched off and container is taken out of heater. Container is allowed to cool. Lid is removed. Voluminous, fluffy mass in the container is taken out. The intimately mixed mass of calcium and aluminium oxide doped with Eu in 2+ state and neodymium in 3+ state is obtained. The mass shows characteristic emission of $Eu^{2+}$ in $CaO.Al_2O_3$ lattice as shown in FIG. 2 and has shape of nanowires as shown in FIG. 3 as imaged by transmission electron microscopy.

Example 2

Figure 4:
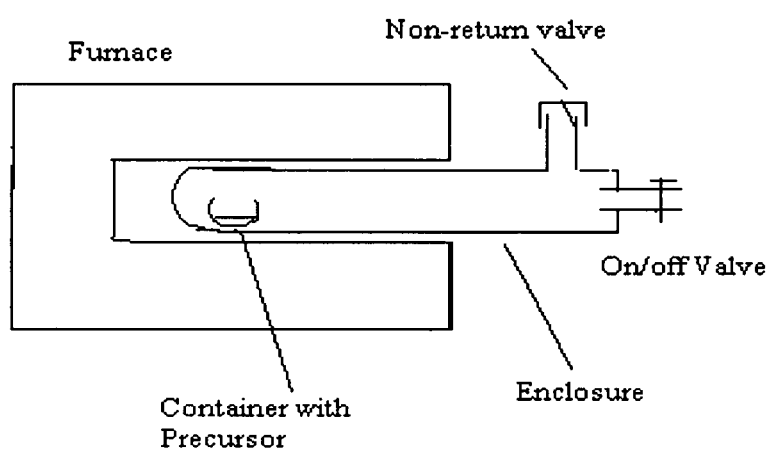
FIG. 4 The figure describes an apparatus consisting of a furnace which can be based electrical energy or chemical energy. It should be capable of heating the enclosure having container with precursor/s mass uniformly to a temperature 200-1000° C. The container with precursor is a vessel that can contain liquid/solid liquid slurry and can be placed comfortably in the enclosure. The enclosure is a chamber capable of standing temperatures up to 1400° C. and has a non-return valve with large opening and an on/off valve. The non-return valve opens and let generated gases escape when the enclosure with contents is placed in furnace and temperature starts rising. Non-return valve does not allow any outside gas in the enclosure. On/off valve is opened before taking out the synthesized sample when combustion reaction is over and enclosure with contents has cooled to near room temperature.

Take 5.27 g $Sr(NO_3)_2$, 18.76 g $Al(NO_3)_3.9H_2O$, 0.107 g $Eu(NO_3)_3.5H_2O$, 0.220 g $Dy(NO_3)_3.5H_2O$, 44 g urea and 0.25 g activated charcoal in a ceramic container of 1000 ml capacity. Small amount of water is added and whole mass is homogenised by stirring. Mass is dried to paste like consistency. The container is placed in a quartz tube with a non-return valve and an on/off valve as shown in FIG. 4. The assembly is put in a furnace heated at 600° C. In about 2-5 minutes, as the tube assembly attains temperature of furnace, a bright yellow flame will be produced in the tube with release of large volume of volatile gases at the ceramic container and shall come out of the tube from non-return valve. When volatiles cease coming out, tube assembly is taken out of furnace. Allowed to cool. On/off valve is opened. Air is allowed to let in. Container full of voluminous, fluffy mass is taken out after opening the tube assembly. The intimately mixed mass of strontium and aluminium oxide doped with Eu in 2+ state and dysprosium in 3+ state is obtained. The mass shows characteristic emission of $Eu^{2+}$ and has shape of nanowires similar to FIG. 3 as imaged by transmission electron microscopy.

Example 3

Take 8.70 g Y $(NO_3)_3.4H_2O$, 9.38 g $Al(NO_3)_3.9H_2O$, 0.108 g $Ce(NO_3)_3.5H_2O$, 27.50 g glycine and 0.15 g activated charcoal in a ceramic container of 1000 ml capacity. The container is placed in a quartz tube with a non-return valve and an on/off valve as shown in FIG. 1. The assembly is put in a furnace heated at 600° C. In about 2-5 minutes, as the tube assembly attains temperature of furnace, a bright yellow flame will be produced in the tube with release of large volume of volatile gases at the ceramic container and shall come out of the tube from non-return valve. When volatiles cease coming out, tube assembly is taken out of furnace. Allowed to cool. On/off valve is opened. Air is allowed to let in. Container full of voluminous, fluffy mass is taken out after opening the tube assembly. The intimately mixed mass of yttrium and aluminium oxide doped with Ce in 3+ state is obtained. The mass shows characteristic emission of $Ce^{3+}$ and has shape of nanowires similar to FIG. 3 as imaged by transmission electron microscopy.

Example 4

Take 8.70 g Y $(NO_3)_3.4H_2O$, 0.108 g $Ce(NO_3)_3.5H_2O$, 10 g urea, 9.40 g glycine and 0.20 g activated charcoal in a ceramic container of 1000 ml capacity of the shape as shown in Fig. Small amount of water is added and whole mass is homogenised by stirring. Mass is dried to paste like consistency. The container is placed on a heater that heats the major part of container uniformly. The heater is heated to 600° C. In about 2-5 minutes, as the container attains temperature, a bright yellow flame will be produced in the container with release of large volume of volatile gases from the top of the container lifting the lid which act as non-return valve. When volatiles cease coming out, Heater is switched off and container is taken out of heater. Container is allowed to cool. Lid is removed. Voluminous, fluffy mass in the container is taken out. The mass of yttrium oxide doped with Ce in 3+ state is obtained. The mass shows characteristic emission of $Ce^{3+}$ in $Y_2O_3$ lattice and has shape of nanowires similar to shown in FIG. 3 as imaged by transmission electron microscopy.

ADVANTAGES OF THE INVENTION

The main advantages of the present invention are:
1. The present invention is suitable for preparation of oxide types of nanomaterials in the form of nanowires useful for the varieties of applications such as luminescent materials, semiconducting, insulating, magnetic and optical material.
2. The process provides nanomaterials in dry powder form.
3. The process provides nanomaterials with dopants in lower valence state.
4. The process is less cumbersome due to very limited number (almost one) of process steps involved.

The invention claimed is:
1. A process for the preparation of a nanomaterial of a metal oxide doped with metal ions in a low valence state, the process comprising the steps of:
   a) mixing a precursor salt of the oxide of at least one metal belonging to Group IIA or IIIA with one or more dopant precursors to provide an oxidizer, one or more dopant precursors containing a nitrate salt of a lanthanide selected from the group consisting of $Eu^{+2}$, $Ce^{+3}$, $Nd^{+2}$, $Dy^{+2}$, and combinations thereof, and wherein the metal salt is selected from the group consisting of nitrate, acetate, oxalate, carbonate and hydroxide,
   b) homogenizing the oxidizer in water along with activated charcoal and a combustible organic fuel to obtain a paste-like mass,
   c) heating the paste-like mass obtained in step (b) in a container, at a temperature in the range of 200° C. to 1000° C., for a period sufficient to produce a bright yellow flame and to generate volatile gases,
   d) cooling the container and removing a fluffy and voluminous mass of nanomaterial comprising nanowires of the at least one Group IIA or IIIA metal oxide doped with the respective lanthanide.
2. A process according to claim 1, wherein the metal in the precursor metal salt is selected from the group consisting of calcium, strontium, aluminum and any mixture thereof.
3. A process according to claim 1 wherein the combustible organic fuel used is selected from the group consisting of urea, hydrazine, citric acid and glycine.
4. A process according to claim 1 wherein the temperature used for combustion of fuel is in the range of from 200° C. to 600° C.
5. A process according to claim 1 wherein the activated charcoal used is in the range of from 0.1 to 5.0 mole percent of total metal salts used in the precursors.

6. A process according to claim 1, wherein the fluffy and voluminous mass is reduced to powder to obtain the nanowires.

7. A process according to claim 1 wherein the size of the nanowires obtained is controlled by the ratio of fuel to oxidizer.

8. A process according to claim 1 wherein the molar ratio of fuel to oxidizer used is in the range of from 0.5 to 7.0.

9. A process according to claim 1 wherein the size of the nanowires obtained is in the range of from 3 to 15 nm.

10. A process according to claim 1 wherein the container used is made of alumina, quartz, ceramic, or stainless steel.

11. A process according to claim 1 wherein the container used is capable of withstanding at high temperature of from 200° C. to 1200° C.

12. A process according to claim 1, wherein the nanomaterial obtained is useful for magnetic, luminescent and/or semi-conducting applications.

13. A process according to claim 6 wherein the size of the nanowires obtained is controlled by the ratio of fuel to oxidizer.

14. A process according to claim 7 wherein the molar ratio of fuel to oxidizer used is in the range of from 0.5 to 7.0.

15. A process according to claim 8 wherein the size of the nanowires obtained is in the range of from 3 to 15 nm.

16. A process according to claim 1, wherein the precursor salt is a nitrate.

17. A process according to claim 4, wherein the combustible organic fuel is urea.

18. A process according to claim 8, wherein the molar ratio of fuel to oxidizer used is 2.0.

19. A process according to claim 10, wherein the container is made of quartz.

20. A process according to claim 14, wherein the molar ratio of fuel to oxidizer is 2.0.

21. A process according to claim 1 wherein the container has a non-return valve and an on/off valve and wherein the process comprises opening the on/off valve to allow air to the container after cooling the container and before removing the nanomaterial.

22. A process according to claim 1 wherein the nanowires have diameters in the range of from 3-15 nm.

23. A process for the preparation of a nanomaterial of a metal oxide doped with metal ions in a low valence state, the process consisting of the steps of:
   a) mixing a precursor salt of the oxide of at least one metal belonging to Group IIA or IIIA with one or more dopant precursors to provide an oxidizer, one or more dopant precursors containing a nitrate salt of a lanthanide having at least two possible valance states, the lanthanide being in a lower one of the at least two valence states, being a valence state of +2 or of +3, wherein if the lanthanide has possible valance states of +2 and +3, the lanthanide is in a valance state of +2 and if the lanthanide has possible valance states of +3 and +4, the lanthanide is in a valance state of +3, and wherein the metal salt is selected from the group consisting of nitrate, acetate, oxalate, carbonate and hydroxide,
   b) homogenizing the oxidizer in water along with activated charcoal and a combustible organic fuel to obtain a paste-like mass,
   c) heating the paste-like mass obtained in step (b) in a container, at a temperature in the range of 200° C. to 1000° C., for a period sufficient to produce a bright yellow flame and to generate volatile gases,
   d) cooling the container and removing a fluffy and voluminous mass of nanomaterial comprising nanowires of the at least one Group IIA or IIIA metal oxide doped with the respective lanthanide.

24. A process for the preparation of a nanomaterial of a metal oxide doped with metal ions in a low valence state, the process comprising the steps of:
   a) mixing a precursor salt of the oxide of at least one metal belonging to Group IIA or IIIA with one or more dopant precursors to provide an oxidizer, one or more dopant precursors containing a nitrate salt of a lanthanide selected from the group consisting of $Eu^{+2}$, $Ce^{+3}$, $Nd^{+2}$, $Dy^{+2}$, and combinations thereof, and wherein the metal salt is selected from the group consisting of nitrate, acetate, oxalate, carbonate and hydroxide,
   b) homogenizing the oxidizer in water along with activated charcoal and a combustible organic fuel to obtain a paste-like mass,
   c) heating the paste-like mass obtained in step (b) in a container, at a temperature in the range of 200° C. to 600, for a period sufficient to produce a bright yellow flame and to generate volatile gases,
   d) cooling the container and removing a fluffy and voluminous mass of nanomaterial comprising nanowires of the at least one Group IIA or IIIA metal oxide doped with the respective lanthanide.

* * * * *